US009174808B2

(12) United States Patent
Nitsch et al.

(10) Patent No.: US 9,174,808 B2
(45) Date of Patent: Nov. 3, 2015

(54) DEVICE AND METHOD FOR FORMING PACKAGING UNITS

(71) Applicant: KHS GmbH, Dortmund (DE)

(72) Inventors: Thomas Nitsch, Kleve (DE); Ernst Van Wickeren, Weeze (DE); Stefan Wagner, Xanten (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 14/362,197

(22) PCT Filed: Nov. 21, 2012

(86) PCT No.: PCT/EP2012/004812
§ 371 (c)(1),
(2) Date: Jun. 2, 2014

(87) PCT Pub. No.: WO2013/079173
PCT Pub. Date: Jun. 6, 2013

(65) Prior Publication Data
US 2014/0339049 A1  Nov. 20, 2014

(30) Foreign Application Priority Data

Dec. 2, 2011 (DE) .......................... 10 2011 119 967

(51) Int. Cl.
| B65G 47/244 | (2006.01) |
|---|---|
| B65B 17/02 | (2006.01) |
| B65B 35/58 | (2006.01) |
| B65G 47/84 | (2006.01) |
| B65B 35/44 | (2006.01) |
| B65G 47/30 | (2006.01) |
| B65G 47/71 | (2006.01) |

(52) U.S. Cl.
CPC .............. *B65G 47/244* (2013.01); *B65B 17/02* (2013.01); *B65B 35/44* (2013.01); *B65B 35/58* (2013.01); *B65G 47/30* (2013.01); *B65G 47/841* (2013.01); *B65G 47/71* (2013.01); *B65G 2201/0244* (2013.01)

(58) Field of Classification Search
CPC .... B65G 47/244; B65G 47/30; B65G 47/841; B65G 2201/0244; B65G 47/71; B65B 35/58; B65B 35/44; B65B 17/02
USPC .................. 198/376, 377.01, 377.07, 377.08, 198/377.09, 394, 395, 418.5, 431, 449; 53/446, 544
See application file for complete search history.

(56) References Cited

U.S. PATENT DOCUMENTS 6,484,478 B1 * 11/2002 Arends et al. .................... 53/544
6,520,314 B1 * 2/2003 Seiling .......................... 198/375
(Continued)

FOREIGN PATENT DOCUMENTS

| DE | 2331193 | 1/1975 |
|---|---|---|
| DE | 4126212 | 2/1993 |

(Continued)

*Primary Examiner* — Leslie A Nicholson, III
*Assistant Examiner* — Keith R Campbell
(74) *Attorney, Agent, or Firm* — Occhiuti & Rohlicek LLP

(57) ABSTRACT

A container-bundler includes a transporter having an alignment section with infinitely revolving single-station conveyor elements drivable in the transport direction with a controllable rotation element. An actuatable adjustment element is arranged in an alignment section. The controllable rotation element interacts with the adjustment element. A partitioning and/or compressing unit is downstream of the alignment section.

20 Claims, 8 Drawing Sheets

(56) References Cited

U.S. PATENT DOCUMENTS

| | | | |
|---|---|---|---|
| 7,198,070 B1* | 4/2007 | Hansen et al. | 141/3 |
| 7,726,464 B2 | 6/2010 | Cerf | |
| 7,861,849 B2* | 1/2011 | Fourney | 198/453 |
| 7,921,980 B2* | 4/2011 | Eder et al. | 198/379 |
| 8,348,077 B2* | 1/2013 | Wimmer | 220/23.4 |
| 2009/0218193 A1* | 9/2009 | Malini | 198/379 |
| 2014/0299445 A1* | 10/2014 | Kolb | 198/376 |

FOREIGN PATENT DOCUMENTS

| | | |
|---|---|---|
| DE | 102006037105 | 2/2008 |
| DE | 102009025824 | 11/2010 |
| DE | 102009044271 | 4/2011 |
| EP | 2096039 | 9/2009 |
| EP | 2258625 | 12/2010 |
| GB | 2225566 | 6/1990 |

* cited by examiner

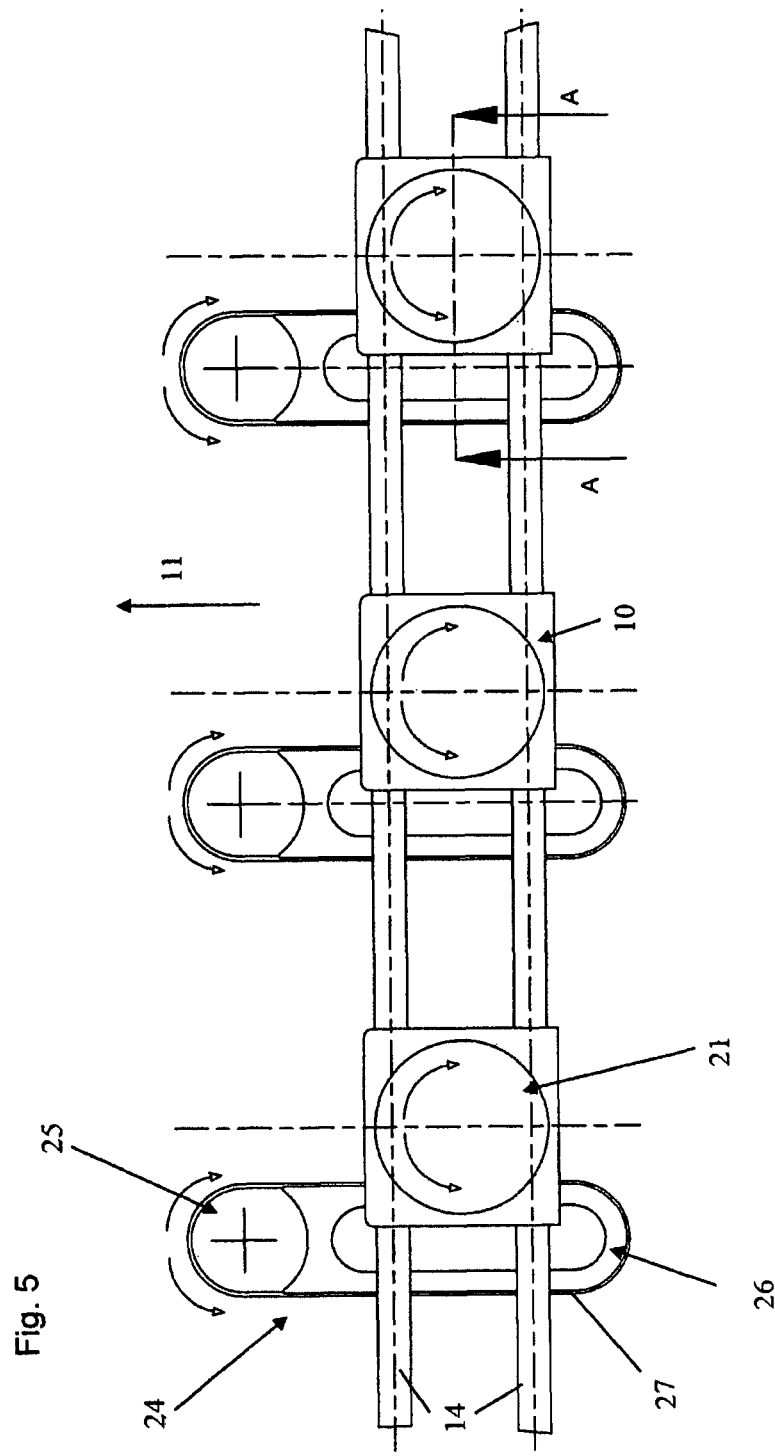

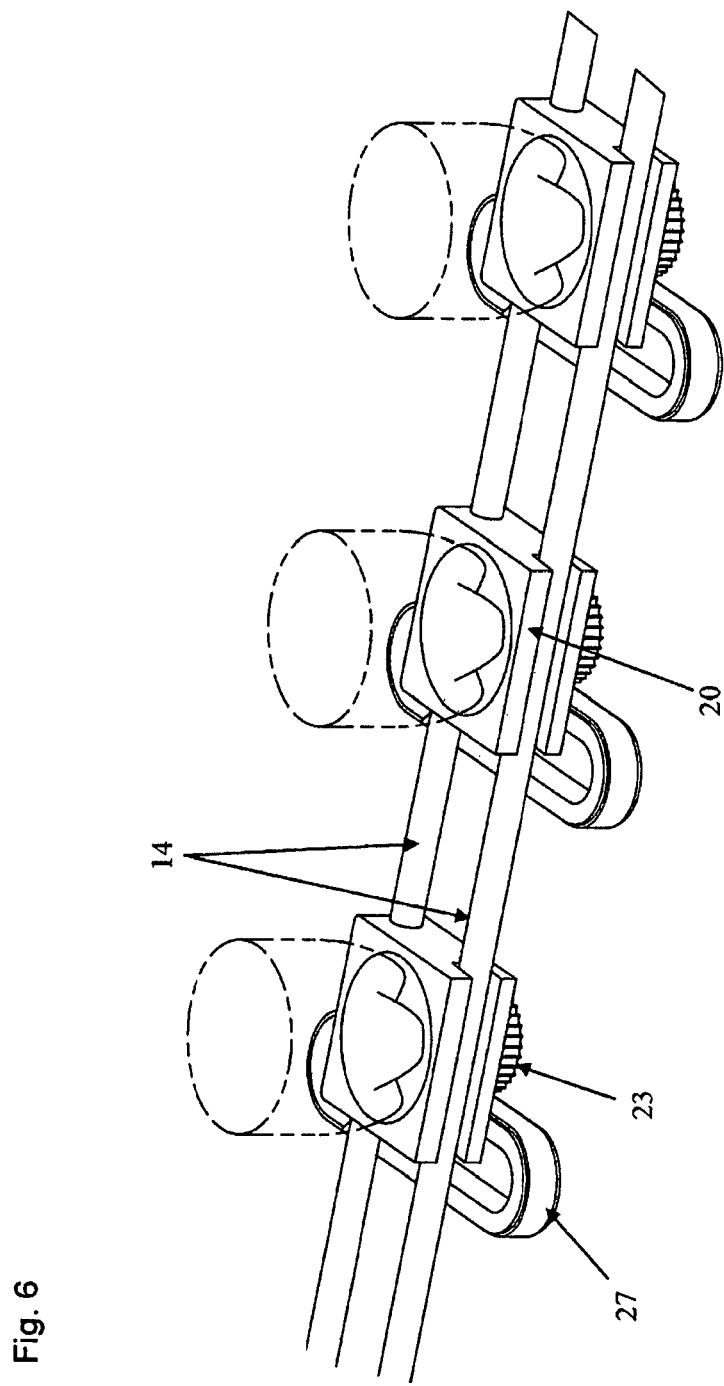

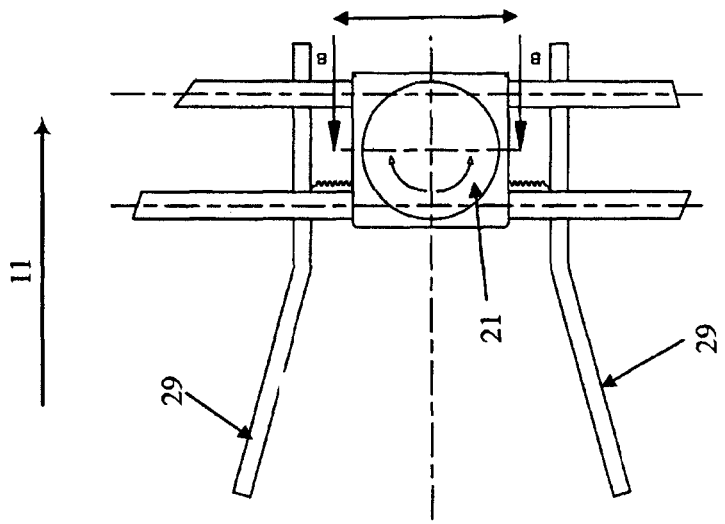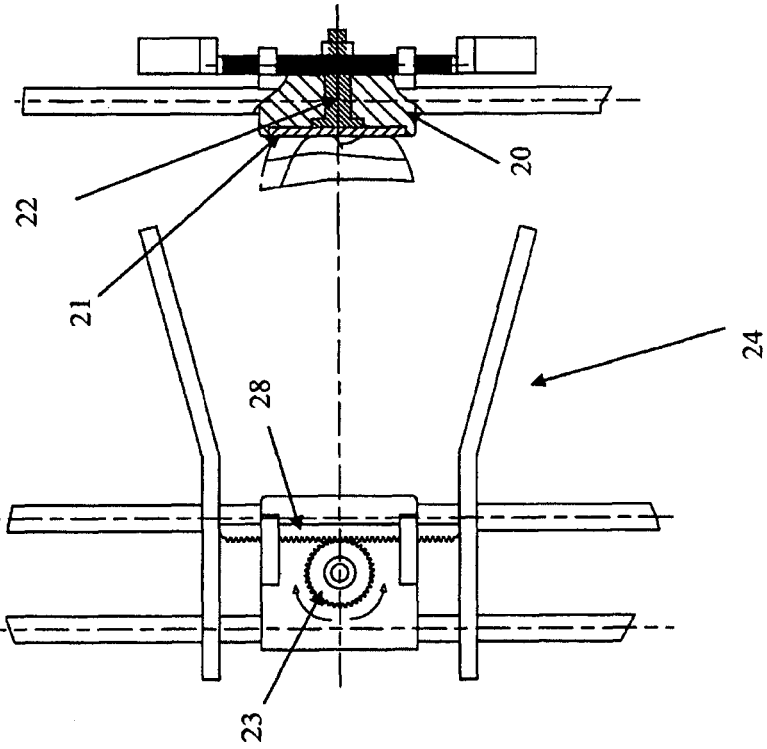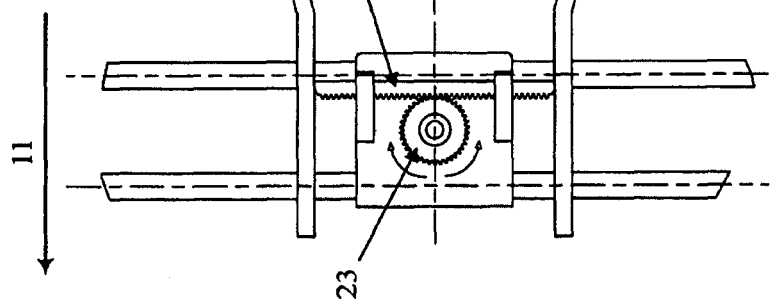

DEVICE AND METHOD FOR FORMING PACKAGING UNITS

RELATED APPLICATIONS

This application is the national stage entry under 35 USC 371 of PCT application PCT/EP2012/004812, filed on Nov. 21, 2012, which claims the benefit of the Dec. 2, 2011 priority date of German application DE 102011119967.9, the contents of which are herein incorporated by reference.

FIELD OF INVENTION

The invention relates to a container processing, and in particular, to producing bundles of containers.

BACKGROUND

It is known to combine articles into a group of articles and from the groups of articles to produce firm and/or transportable storage and transport units or bundles by using shrink films. However, a disadvantage of shrink films is that the films used, and the need to use heat or other forms of energy for shrinking-on of the films causes considerable expense. U.S. Pat. No. 7,726,464 provides an example of this approach.

It is also known to produce transportable bundles by strapping containers together into a bundle, for example by using strapping that encompasses the container group in the manner of a loop. This is a particularly inexpensive and simple way of producing bundles or transport and storage units. The strapping can also be bonded with the containers. DE102009025824, DE10209044271, and DE4126212 provide examples of this approach.

One disadvantage of strapping however, is that when a container is first removed from such a bundle, the remaining containers in the bundle are no longer held together by the strapping. This is the case not only when the strapping is removed or cut but also when one removes a container from the pack without severing the strapping.

Moreover transporting such bundles on a belt conveyor often presents the danger that cylindrical or chiefly cylindrical articles, such as cans, bottles or containers, assume a nesting position, i.e. slip into a gap in the adjacent row, due to vibration, impacts etc. With known packs, a very high tension must be applied to the strapping in order to avoid this.

DE102006037105 teaches combining of bottle packets in which a rotary star wheel that presses bottle necks into clips on flat carriers is provided on both sides of a track. The bottle packet is also wrapped with a film, such as a tape or an envelope.

According to DE2331193, an adhesive is applied to containers in narrow surfaces or rows, with contiguous surfaces that are not provided with adhesive being intended to facilitate a gripping of the packing for carrying purposes. The containers stick to one another at the adhesive points. EP 2096039 also relates to containers being provided with an adhesive, with a shrink film also being disposed around the bottle packet however.

SUMMARY

The object of the invention is to provide a device and a method for producing bundles in which the containers of a bundle are accepted within the bundle in an aligned manner.

This object is achieved by providing a device for producing bundles with there being provided a transporter that has an alignment section that has infinitely revolving single-station conveyor elements that can be driven in the transport direction and that have a controllable rotation element, with the partitioning and/or compressing unit or the partitioning and/or compressing section being downstream of the alignment section. It is possible by way of the alignment section for a container standing on a single-station conveyor element to be moved from its original position to the desired position, i.e. to be aligned. By way of the partitioning and/or compressing unit or the partitioning and/or compressing section, containers can be brought together into a bundle and transported onward, with the bundle being film-less and free from strapping. Despite the lack of an enveloping film and/or despite the lack of strapping, the articles are always prevented by simple means from adopting a nesting position while being transported. And, even after one or more articles are removed from a bundle, the cohesion of the remaining articles in the bundle is maintained and/or can be restored.

Containers in the sense of the invention include, for example, bottles, such as PET bottles, cans, tubes, and pouches made from metal, glass and/or plastic, and other packaging elements, in particular those that are suitable for the filling of liquid or viscous products.

Such containers have a spherically arched contact region that permits the containers to roll off against one another around a peripheral path, i.e. at a "roll-off ring". With glass bottles, multiple use of the bottle can be detected by a wear ring that is usually recognizable in bright light. In the case of PET bottles such roll-off rings can be arranged not only in the head region but in the foot region also.

"Adhesive agents" in the sense of the invention includes all materials or masses that facilitate an adhesive bond between containers, in particular compounds, materials or masses that when applied in the liquid or semi-liquid state form a self-adhesive coat and/or bring about an adhesive bond under the application of pressure and/or energy and/or after curing or cross-linking.

"Adhesive agents" in the sense of the invention also include multilayer materials, e.g. those comprising at least one carrier material that is coated with a material with which an adhesive bond between containers is possible, are therefore bondingly and/or adhesively active on at least two sides. Such adhesive agents can also be referred to as pads.

An "adhesive container" has, in the sense of the invention, bonding agent or adhesive, or is provided with an application of bonding agent and adhesive. The bonding agent or adhesive is preferably selected such that the containers can be detached from the pack and/or separated from one another by hand and without damage.

It is conceivable for liquid adhesive agent to be applied by the application elements. It is possible to apply a low-viscosity UV-curing adhesive. A hot-melt adhesive would also be suitable. But such an adhesive cools very rapidly and so could lose its adhesive properties before the containers of the bundle are sufficiently bonded to one another. A UV-curing adhesive is also beneficial due to the particularly easy setting of its desired properties. A corresponding curing station or curing section is expediently provided downstream of the application elements statically or along the linear transporter above and/or if necessary also below. A curing station can be a tunnel with UV-lighting, for example.

It is beneficial if, in its alignment section, the transporter has a plurality of single-station conveyor elements that accompany the containers from the inlet side towards the outlet side or towards a subsequent section of the transporter. At the same time the single-station conveyor elements are beneficially arranged beside one another on common cross-rails that are continuously driven by a driving means, which can be embodied as a chain or as a toothed belt.

The individual containers are transferred from a first section of the transporter to the alignment section. The alignment section is followed, when seen in transport direction, by a third section, which is in turn followed by the partitioning and/or compressing unit or partitioning and/or compressing section which will be described hereinafter. In the process the containers are transferred, in a targeted manner, singly, to the respective single-station conveyor element.

It is beneficial if deflector elements that homogenize the deflection are provided in a transition to the alignment section. The deflector elements are advantageously configured in the shape of a wedge, i.e. they widen from their tip to their base in the direction of the alignment section, with the tip being oriented away from the alignment section. This creates a continuously tapering path for the containers towards the alignment section such that the containers can also be transferred singly to the appropriate single-station conveyor element.

The deflector elements can be implemented as, for example, a pointed cone or a right-angle triangle, to name only some possible configuration examples.

The respective single-station conveyor element can also be referred to as a carrier element that has a rotatable support surface, i.e. the actuatable rotation element, disposed in a carrier body. A shaft extends away from the rotatable support surface. The shaft can carry a gearwheel or a pulley or be provided with gearing in sections or even entirely. The carrier body is beneficially connected to the cross-rails, but transversely, i.e. fixed in position along the cross-rails. It is however also conceivable for an actuatable motor to be provided on the carrier element instead of a shaft with gearwheel and/or gearing, whereby the motor could effect a rotation.

In a preferred embodiment, provision can be made to provide actuatable adjustment elements that act on the single-station conveyor elements or on their rotation mechanism (rotation element, support surface, shaft) and that can rotate the support surface by predetermined amounts. The adjustment elements can be arranged opposite the support surface on an underside of the single-station conveyor element or of the alignment section.

In a first embodiment, the adjustment elements are implemented as a chain or belt drive and have a driven wheel and a guide element about which the endless chain or the endless belt is run. The adjustment element or adjustment elements are fixed-position in this embodiment. It is an advantage if each row of single-station conveyor elements is associated with an adjustment element past which the single-station conveyor elements are transported in such a way that the gearwheel, pulley, or shaft with the section of gearing engages with the chain or toothed belt. The driven gearwheel is connected to an actuatable motor that receives its control signals from a control unit or from a central control unit of the inventive device, as will be explained hereinafter.

In a further possible embodiment, the adjustment are implemented as a rack-and-pinion drive, with the rack in engagement or engaging with the gearwheel or the geared section of the shaft. It may be advantageous for a rack to be arranged on longitudinal spars, as a transverse bar parallel with the cross-rails, with the longitudinal spars being mounted on the cross-rails so as to be motor-controlled and capable of transverse displacement. The difference is apparent here between this and the fixed-position arrangement of the adjustment elements, which, in this embodiment are, entrained with the cross-rails in transport direction, which is why an adjustment element can also be arranged on each single-station conveyor element. It is also possible for the rack-and-pinion drive to be provided in a fixed position when the rack is oriented parallel and not square to the transport direction.

The containers of the respective single-station conveyor element, which are standing upright on the respective rotatable support surface, can be rotated with the adjustment elements by a desired angular amount such that, later on, all containers of a bundle are aligned, preferably each aligned identically. This can be achieved by having, at the inlet side of the transporter or of its alignment section or at another suitable position, one or more detection systems that detect container and/or configuration features, for example embossings or other distinctive container-specific configurations such as labels or cap decorations for example. The detection system can then reference and/or compare the detected actual data with desired data and, depending on the difference between the desired data and the actual data, generate an appropriate control signal for the adjustment elements so that the container concerned is aligned according to the desired data.

In the process, the control unit can send a control signal to the respective drive of the adjustment element. If the adjustment element is implemented with a toothed belt or chain that is arranged parallel to the transport direction, and if the alignment section has a constant conveying speed along its transport direction, then the container standing on the single-station conveyor element can be rotated into the desired position by a speed of the belt or chain relative to the single-station conveyor element which is moving past it. If the speed of the circulating chain or belt is the same as the transport speed, the container will remain in its position and will therefore not be rotated. If the circulatory speed of the toothed belt or chain is greater than the transport speed, the container is rotated to one side, e.g. to the right. If the circulatory speed of the toothed belt or chain is less than the transport speed, the container is rotated to the other side, e.g. to the left. To this extent, in order to align of the containers, the detection system generates a signal that regulates the power of the drive motor such that different speeds of the chain or belt can be set accordingly.

If, however the adjustment element has a rack that is disposed square to the transport direction and that is mounted on the longitudinal spars so as to be displaceable transversely to the cross-rails, then the generated control signal can control a motor that transversely displaces the longitudinal spars, and hence the rack, relative to the axis of rotation of the shaft of the single-station conveyor element in both directions, i.e. to left or to right. The container can therefore be rotated to the right or left into the desired position.

A third section, onto which the aligned containers are transferred, follows the output end of the alignment section. In order to maintain the aligned position of the container, it is expedient to provide a fixing element that travels with the conveyor element of the third section for. The fixing element can be referred to as a formed part that is disposed on a transverse bar, that encompasses the container so that it cannot twist, and that is itself fixed so that it cannot twist along its transport path. A plurality of containers can be disposed adjacent to one another in rows such that a plurality of fixing elements, one for each container, are also provided. Additionally, guide rails may also be provided to laterally guide containers in each container track.

In one embodiment, an arrangement can be provided to secure the containers standing on the single-station conveyor element to a head guide. The head guide is configured to allow alignment to be carried out. A travelling packing and centering tulip can be used to implement a head guide.

The partitioning and compressing unit or partitioning and compressing section follows the third section. This is where application elements for applying adhesive agent to the respective container are provided so that the containers of the subsequent bundle are not only aligned relative to each other but are adequately interconnected or adhere to one another without the use of film or wrapping elements.

It is also possible to already provide application elements upstream of or along the alignment section. With such an embodiment, adjacent single-station conveyor elements could be rotated as a group through, for example, 90°, for example by way of a motor, and fed to the subsequent compressing unit or compressing section.

If UV-curing adhesive is applied, a curing station or curing section can be arranged at the partitioning and/or compressing unit or compressing section.

The bundle, i.e. the complete bundle, which is made up of the partial bundles, can be implemented in a plurality of rows when seen in transport direction, i.e. for example in two or three rows.

It is possible also to provide the bundle, i.e. the complete bundle, with a carrying element, for example a handle. Suitable devices may be provided which are arranged downstream of the outlet side or at a suitable position on the linear transporter to provide such a handle. The carrying element can also be attached to the bundle with the afore-mentioned adhesive agent.

In this way the invention provides a device for producing a bundle in which the containers are aligned in the bundle and in which despite the lack of an enveloping film and/or despite the lack of strapping, the containers are prevented by simple means from adopting a nesting position while being transported, in particular along the partitioning and/or compressing unit or partitioning and/or compressing section. Even after one or more containers are removed from a bundle the cohesion and alignment of the remaining containers in the bundle is maintained. Dispensing with a film or strapping band in such a filmless bottle pack eases the burden on the environment by avoiding waste, and by saving resources, and in particular plastic, used to produce the films or strappings. The containers of a bundle are aligned and stuck directly to one another during transport, i.e. in the continuous operation of the device for producing bundles. It is also beneficial that the individual containers do not have to be rotated, e.g. to be able to adequately apply the adhesive. A filmless bottle pack can also be achieved by applying just enough adhesive to adequately bond the individual containers to one another.

In one aspect, the invention features an apparatus for producing bundles of containers from containers that are provided by a container input, wherein the container input that provides the containers to be bundled includes a structure selected from the group consisting of a single track container feed, a multiple track container feed, a single track container stream, and a multiple track container stream, wherein containers that arrive on the container input have an arbitrary orientation with respect to a container structure, wherein the container structure is selected from the group consisting of a container feature and a configuration feature of the container, wherein a grouping structure partitions and compresses a predetermined number of containers, wherein the grouping structure is selected from the group consisting of a partitioning unit, a compressing unit, a partitioning section, and a compressing section, wherein the predetermined number of containers are at least one of compressed and formed into at least one of container groups and partial bundles that are formed and subsequently combined into a subsequent bundle, wherein application elements are provided by way of which a substance can be applied on at least one contact surface of at least one of the containers of the subsequent bundle of containers, wherein the substance is selected from the group consisting of an adhesive agent and an adhesive agent application, wherein the apparatus includes a plurality of infinitely revolving single-station conveyor elements, an adjustment element, a transporter for transporting in a transport direction, an alignment section, and a controllable rotation element, wherein the alignment section is a constituent of the transporter, wherein the controllable rotation element is a constituent of the transporter, wherein the infinitely revolving single-station conveyor elements are constituents of the alignment section, wherein the infinitely revolving single-station conveyor elements are drivable in the transport direction, and wherein the adjustment element is arranged in the alignment section, wherein the adjustment element is capable of being actuated, wherein the controllable rotation element interacts with the adjustment element, and wherein the grouping structure is downstream of the alignment section.

Some embodiments further include cross-rails, wherein the single-station conveyor elements are arranged side-by-side on the cross-rails in the transport direction at right angles to the transport direction.

Other embodiments further include deflector elements, wherein the deflector elements are arranged at a crossing between a first section of the transporter and the alignment section. Among these are embodiments in which each deflector element includes a wedge having a tip and a base.

In some embodiments, the rotation element includes rotatable support surface, and shaft disposed on the surface, the shaft including a structure selected from the group consisting of a gearwheel, a pulley, and a geared section.

Other embodiments include a support surface of a single-station conveyor element, wherein the adjustment element is arranged opposite the support surface on an underside of the alignment section.

Also among the embodiments are those in which the adjustment element includes a first structure and a second structure, wherein the first structure is selected from the group consisting of a chain and a belt drive, a driven wheel, and an idling wheel about which a second structure is guided, wherein the second structure is selected from the group consisting of an endless chain and an endless belt.

Some embodiments further include cross-rails and longitudinal spars, wherein the rotation element includes a shaft, wherein the shaft includes a gearwheel, wherein the adjustment element includes a rack-and-pinion drive, wherein the rack-and-pinion drive includes a rack that engages the gearwheel of the shaft of the rotation element, wherein the rack is arranged parallel to cross-rails on the longitudinal spars, wherein the longitudinal spars are mounted on the cross-rails, and wherein at least in part as a result of being mounted on the cross-rails, the longitudinal spars are capable of transverse displacement.

Other embodiments further include a detection system, wherein the detection system compares an actual position of the containers with a desired position of the containers, wherein the detection system generates a control signal for causing operation of the adjustment elements, wherein causing operation includes at least one of causing actuation of an adjustment element and causing adjustment of an adjustment element, wherein operation of the adjustment element results causes the rotation element to operate in a manner that permits at least one of movement and rotation of a container into a desired position thereof.

In yet other embodiments, the transporter further includes fixing elements, wherein the fixing elements are arranged in a third section that is downstream from the alignment section.

Further embodiments, advantages and possible applications of the invention arise out of the following description of embodiments and out of the figures. All of the described and/or pictorially represented attributes whether alone or in any desired combination are fundamentally the subject matter of the invention independently of their synopsis in the claims or a retroactive application thereof. The content of the claims is also made an integral part of the description.

BRIEF DESCRIPTION OF THE DRAWINGS

The invention is explained in detail below through the use of an embodiment example with reference to the figures. In the figures:

FIG. 5 shows the adjustment element of FIG. 4 in a perspective view,

FIG. 6 shows the adjustment element of FIG. 4 in a perspective view,

FIG. 7 shows an adjustment element in a second embodiment in a plan view in which the support surface is removed, FIG. 8 shows the adjustment element of FIG. 7 in side view along a section B-B from FIG. 9, FIG. 9 shows the adjustment element of FIG. 7 in plan view with support surface.

In the different figures, the same reference character in each case identifies identical parts, which is why they are generally described only once. Articles are referred to as containers hereinafter.

DETAILED DESCRIPTION

Figure 1:
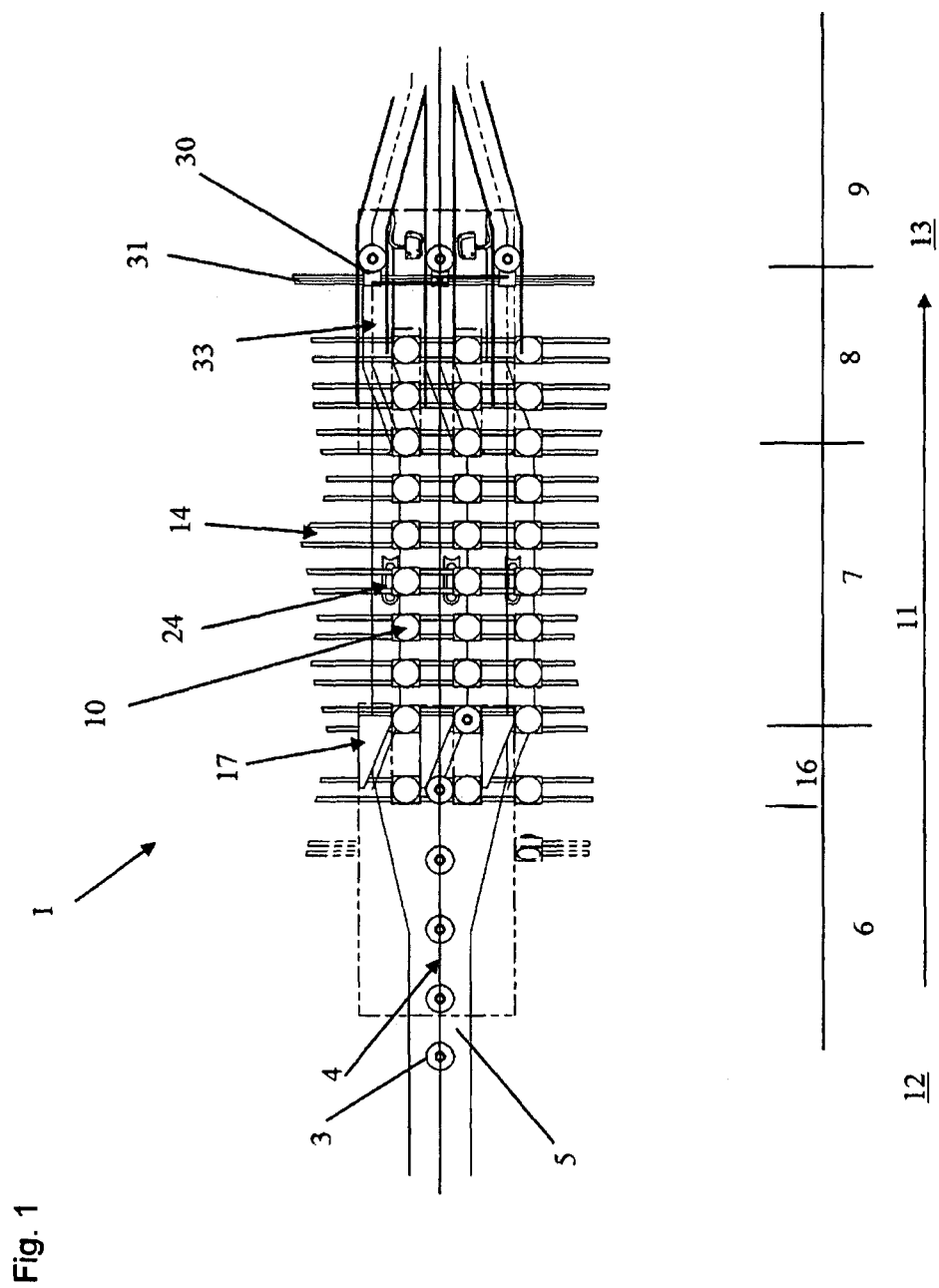
FIG. 1 shows a partial section of a device for producing a bundle in plan view.

FIG. 1 shows a partial section of a device 1 for producing bundles 2 (FIG. 10) from containers 3, with containers arriving via a stream that starts as a wide container stream and is then converted into a single-track container streams 4. Within a stream, containers 3 have an arbitrary orientation, for example with respect to their container features and/or configuration features.

The device 1 shown in FIG. 1 includes a transporter 5 having three sections 6,7,8. The first section 6 is arranged at an inlet side and merges into an alignment section 7. A third section 8 follows the alignment section 7. A partitioning and/or compressing unit or compressing section 9 follows the third section 8. The partitioning and/or compressing unit or compressing section 9 has application elements for, for example, the spraying or injection application of adhesive agent onto containers. The partitioning and/or compressing unit or compressing section 9 will be described i in detail herein below.

The alignment section 7 has endlessly revolving single-station conveyor elements 10 that can be driven along a transport direction 11 and that have a controllable rotation element 12. It is possible, using the alignment section 7, for a container 3 standing on single-station conveyor element 10 to be moved from its original position to a desired position, i.e. aligned. By way of the partitioning and/or compressing unit or partitioning and/or compressing section 9, containers 3 can be brought together to form a bundle and to be transported onward without using a film or strapping band.

Figure 2:
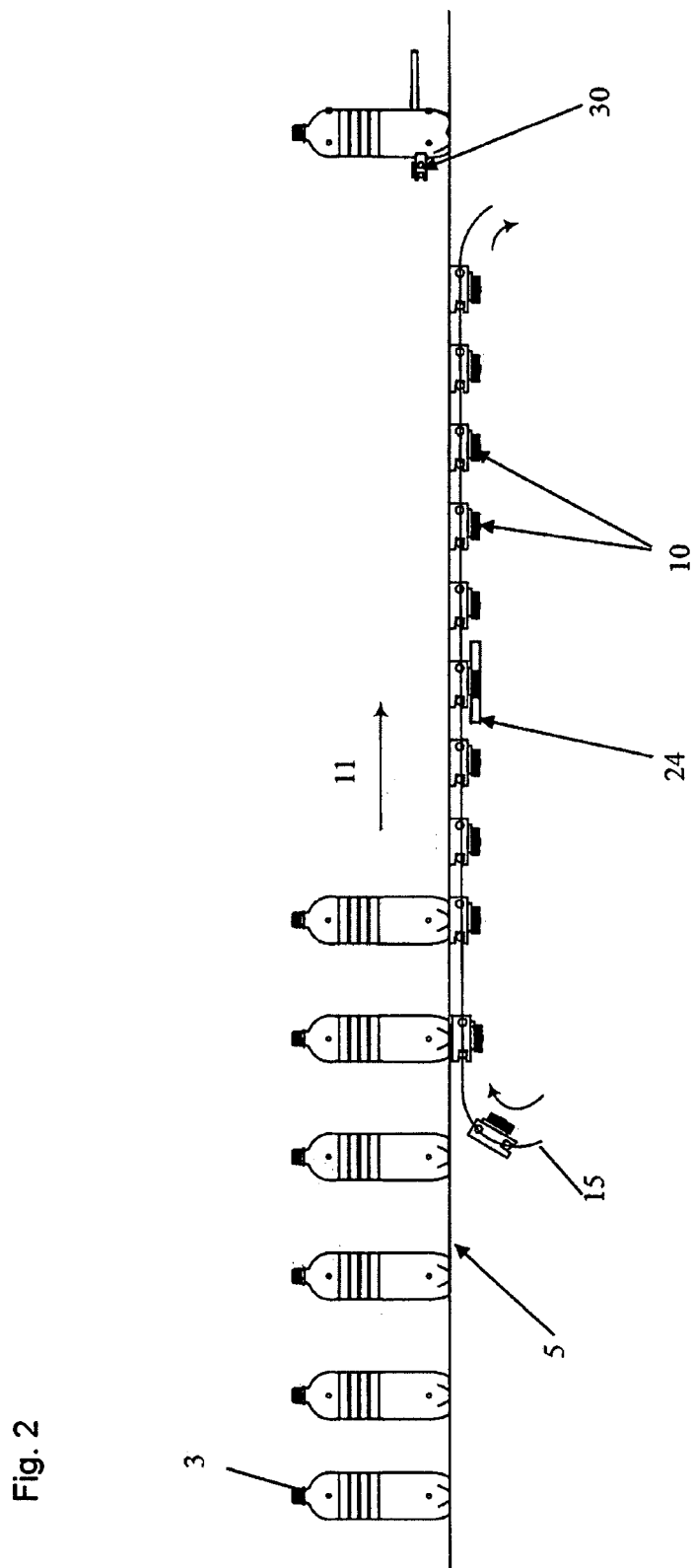
FIG. 2 shows the partial section of FIG. 1 in a side view.

As can be seen from FIG. 1, the transporter 5 has, in its alignment section 7, a plurality of single-station conveyor elements 10 that accompany the containers 3 from the inlet side towards an outlet side 13 or towards the third section 8 of the transporter 5. At the same time, the single-station conveyor elements 10 are beneficially arranged beside one another on common cross-rails 14. Driving means, which can be embodied as a chain or as a toothed belt, as can be seen from FIG. 2, continuously drive the common cross-rails 14. Groups of three single-station conveyor elements 10 are arranged, for example, on a common cross-rail 14 so that the containers are transported in three container tracks in the direction of third section 8.

A first section 6 of the transporter 5 transfers individual containers 3 to the alignment section 7, i.e. to respective single-station conveyor element 10.

Deflector elements 17 disposed in a crossing 16 to the alignment section 7 homogenize the deflection. The deflector elements 17 are configured, for example, as wedges that widen from their tip 18 to their base 19 in the direction of the alignment section 7, with the tip 18 being oriented away from alignment section 7. This creates a continuously tapering path for containers 3 towards the alignment section 7 such that containers 3 can also be transferred singly to appropriate single-station conveyor element 10.

Figure 3:
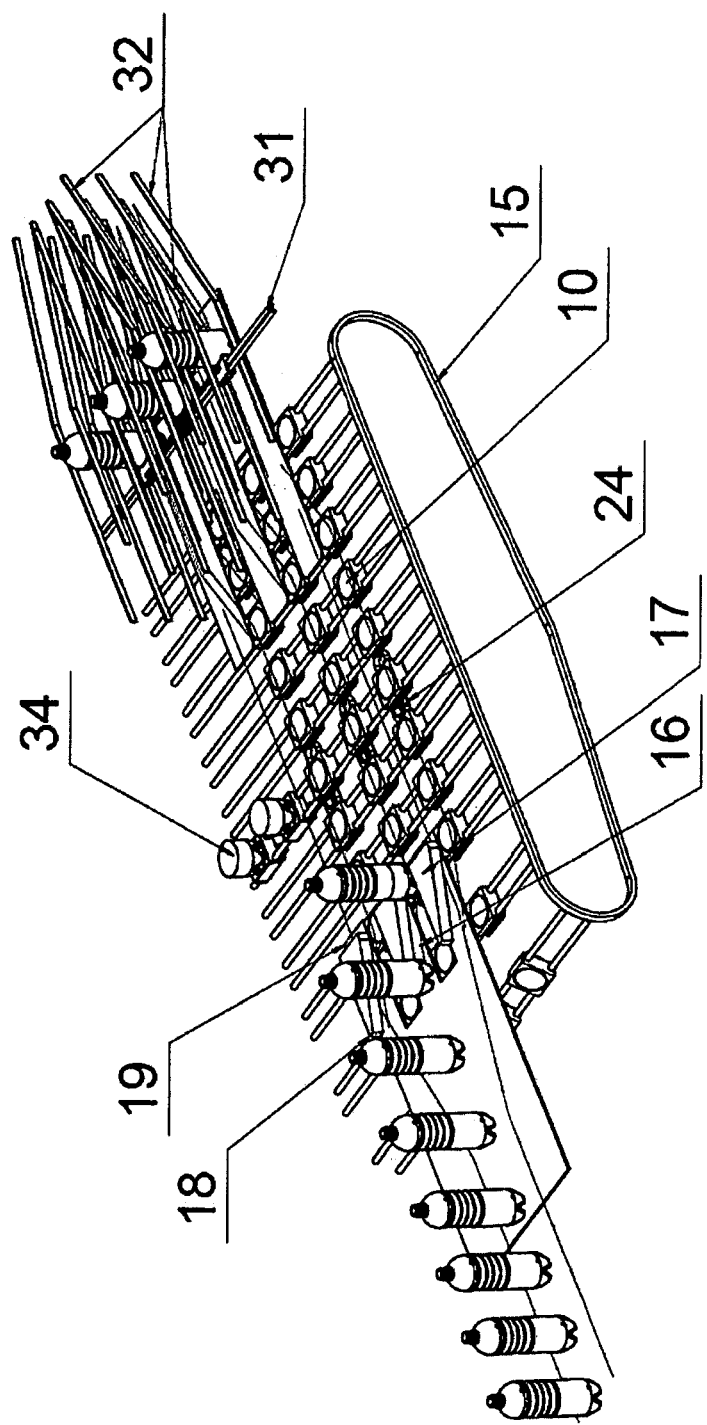
FIG. 3 shows the partial section of FIG. 1 in a perspective view.

The deflector elements 17 can also be implemented as a pointed cone, or as a right-angle triangle, as shown in FIG. 3, to name only some possible configuration examples.

A single-station conveyor element 10, which is also referred to as a "carrier element" 10, has a rotatable support surface, i.e. the actuatable rotation element 21, disposed in a carrier body 20. A shaft 22 extends away from the rotatable support surface 21. The shaft 22 carries a gearwheel 23 or a pulley 23 or is provided with gearing in whole or in part. The carrier body 20 is connected to cross-rails 14, but transversely, i.e. fixed in position along the cross-rails 14. It is, however, also conceivable for an actuatable motor to be provided on the carrier element instead of a shaft with gearwheel and gearing, in which case the motor effects a rotation.

Actuatable adjustment elements 24 act on the single-station conveyor elements 10 or on their rotation mechanism, namely the rotation element 21, the support surface, and the shaft. The adjustment elements 24 can the rotate support surface 21 by predetermined amounts. The adjustment elements 24 are arranged opposite the support surface 21 on an underside of the single-station conveyor element 10 or of the alignment section 7.

Figure 4:
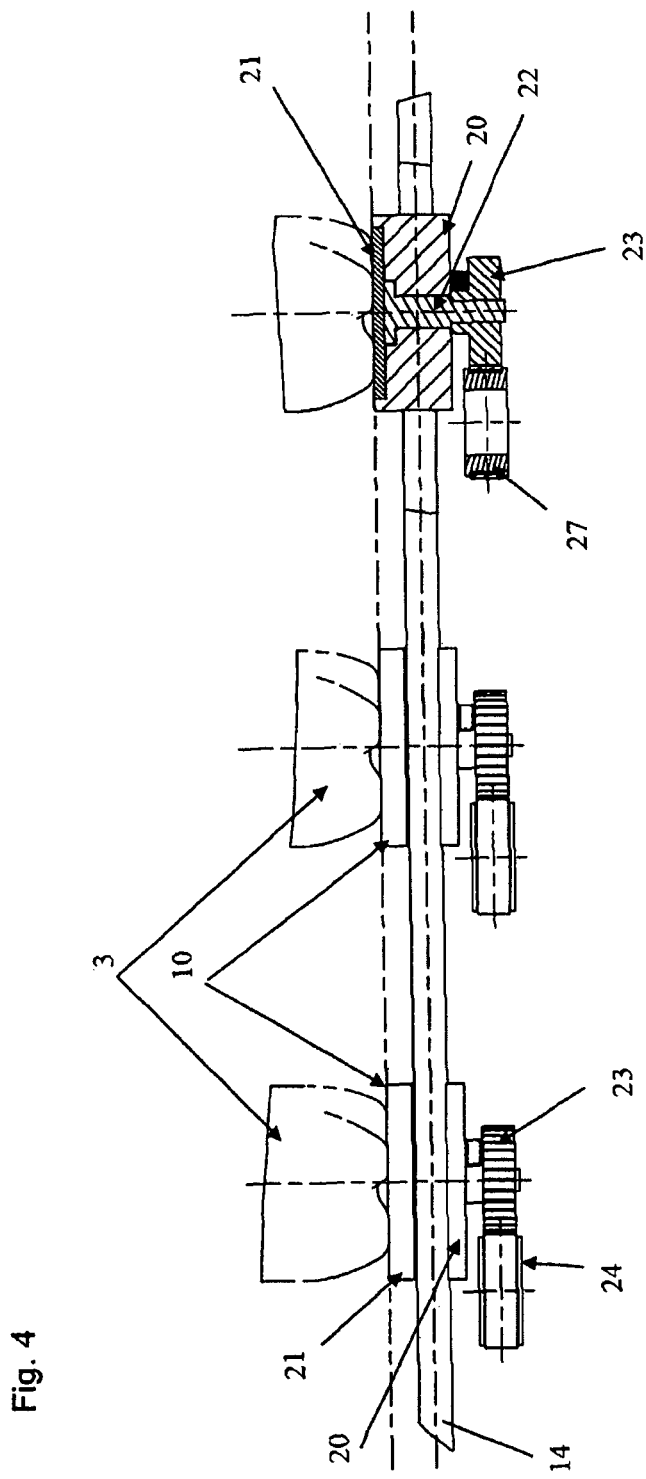
FIG. 4 shows an adjustment element in a first embodiment in side view.

In an embodiment depicted in FIG. 1 and in FIGS. 4 to 6, the adjustment elements 24 are implemented as a chain or belt drive that has a driven wheel 25 and a guide element 26 about which an endless chain 27 or endless belt 27 is guided. The adjustment element or adjustment elements 24 are fixed-position in this embodiment.

It is an advantage if each row of single-station conveyor elements 10 is associated with an adjustment element 24 past which the single-station conveyor elements 10 are transported in such a way that the gearwheel 23, the pulley 23 or the shaft with the section of gearing engages the chain 27 or toothed belt 27.

The driven wheel 25 is connected to an actuatable motor that receives its control signals from a control unit or from a central control unit of the inventive device as will be explained hereinafter. The guide element can be a rotatably mounted wheel or, as depicted by way of example, a linear element on which a belt slides or is guided. The guide element has a central slot-like recess.

In an embodiment depicted in FIGS. 7 to 9, the adjustment elements 24 are implemented as a rack-and-pinion drive, with its rack 28 in engagement or engaging with the gearwheel 23 or the geared section of the shaft 22. As can be seen, the rack 28 is arranged on longitudinal spars 29 as a transverse bar parallel with the cross-rails 14, with longitudinal spars 29 being mounted on cross-rails 24 so as to be motor-controlled and capable of transverse displacement.

The rack 28 is transversely displaceable with the displacing of longitudinal spars 29 along the cross-rails 14. The difference is apparent here between this and the fixed-position arrangement of adjustment elements 24 according to FIG. 4, which in this embodiment, according to FIG. 7, are entrained with the cross-rails 14 in the transport direction 11. This is why an adjustment element 24 is also arranged on each single-station conveyor element 10 according to the embodiment in FIG. 7. This is shown in FIG. 3, alternatively, by way of the two upper single-station conveyor elements 10 in the plane of the drawing, this alternative being emphasized in FIG. 3 with reference number 34.

It is also possible for the rack-and-pinion drive to be provided in a fixed position when the rack is oriented parallel and not square to the transport direction 11. Longitudinal spars 29 each have a region disposed at right angles to the cross-rail 14 and on which the rack 28 is arranged. In a rear region, longitudinal spars 29 each run in the direction of the cross-rail 14 obliquely to the center-line such that, when seen in plan view, a space that tapers towards the cross-rail 14 is created between both longitudinal spars 29.

Containers 3 of the single-station conveyor element 10, which are standing upright on respective rotatable support surface 21, can be rotated with the adjustment elements 24 by a desired angular amount such that, later on, all containers 3 of a subsequent bundle 2 are aligned, preferably identically. This can be achieved by having, on the inlet side of the transporter 5 or of its alignment section 7, or at another suitable position, one or more detection systems that detect container and/or configuration features, i.e. for example embossings, or other distinctive container-specific configurations, such as labels or cap decorations. The detection system can then reference and/or compare the detected actual data with desired data, and, depending on the difference from the desired data, generate an appropriate control signal for the adjustment elements 24 so that the container concerned 3 is aligned according to the desired data.

In the process, the control unit can send a control signal to the respective drive of the adjustment element 24. If the adjustment element 24 is implemented with a toothed belt 23 or chain 23, which is arranged parallel to the transport direction 11, and if the alignment section 7 has a constant conveying speed along its transport direction 11, then a container 3 standing on single-station conveyor element 10 can be rotated into the desired position by a speed of the belt 23 or the chain 23 relative to the single-station conveyor element 10 that is moving past it. If the speed of the circulating chain 23 or belt 23 is the same as the transport speed, the container 3 will remain in its position and will not, therefore, be rotated. If the circulatory speed of the toothed belt 23 or chain 23 is greater than the transport speed, the container 3 is rotated to one side, e.g. to the right in the drawing plane. If the circulatory speed of the toothed belt 23 or the chain 23 is less than the transport speed, the container 3 is rotated to one side, e.g. to the left in the drawing plane. To this extent, for the aligning of containers 3 the detection system generates a signal that regulates the power of the drive motor such that different speeds of the chain or belt can be set accordingly. The direction of rotation of the driven wheel 25 can also be controlled, as indicated in FIG. 5, which shows a container row on common cross-rails 14. As indicated in FIG. 6, the carrier bodies 20 are also mounted displaceably, preferably however in fixed position, along the cross-rails, not only when a container 3 is standing thereon.

If, however, the adjustment element 24 has a rack 28 that is disposed square to the transport direction and that is mounted on the longitudinal spars 29 so as to be displaceable transversely to the cross-rails 14, then the generated control signal can control a motor that transversely displaces the longitudinal spars 29 and hence the rack 28 relative to the axis of rotation of shaft 22 of single-station conveyor element 10 in both directions, i.e. to left or to right, or a staying in position. The container 3 can therefore be rotated to the right or left into the desired position, or not rotated at all if is already at the desired position.

At the output end of the alignment section 7 follows third section 8 onto which aligned containers 3 are transferred. A fixing element 30 is provided so that the aligned position of the container 3 is maintained. The fixing element 30 can be referred to as a formed part that is disposed on a transverse bar 31, and that encompasses the container 3 so that it cannot twist and is itself fixed so that it cannot twist along its transport path. A plurality of containers 3 can be disposed adjacent to one another in rows such that a plurality of fixing elements 30, one for each container 3, are also provided. Additionally, guide rails 32 may also be provided to laterally guide containers 3 in each container track.

The aligned containers are transferred in this way to the partitioning or compressing unit or section 9, which, in FIG. 1, is only formed in principle and by way of example from three transport paths 33 to be run sequentially.

Figure 10:
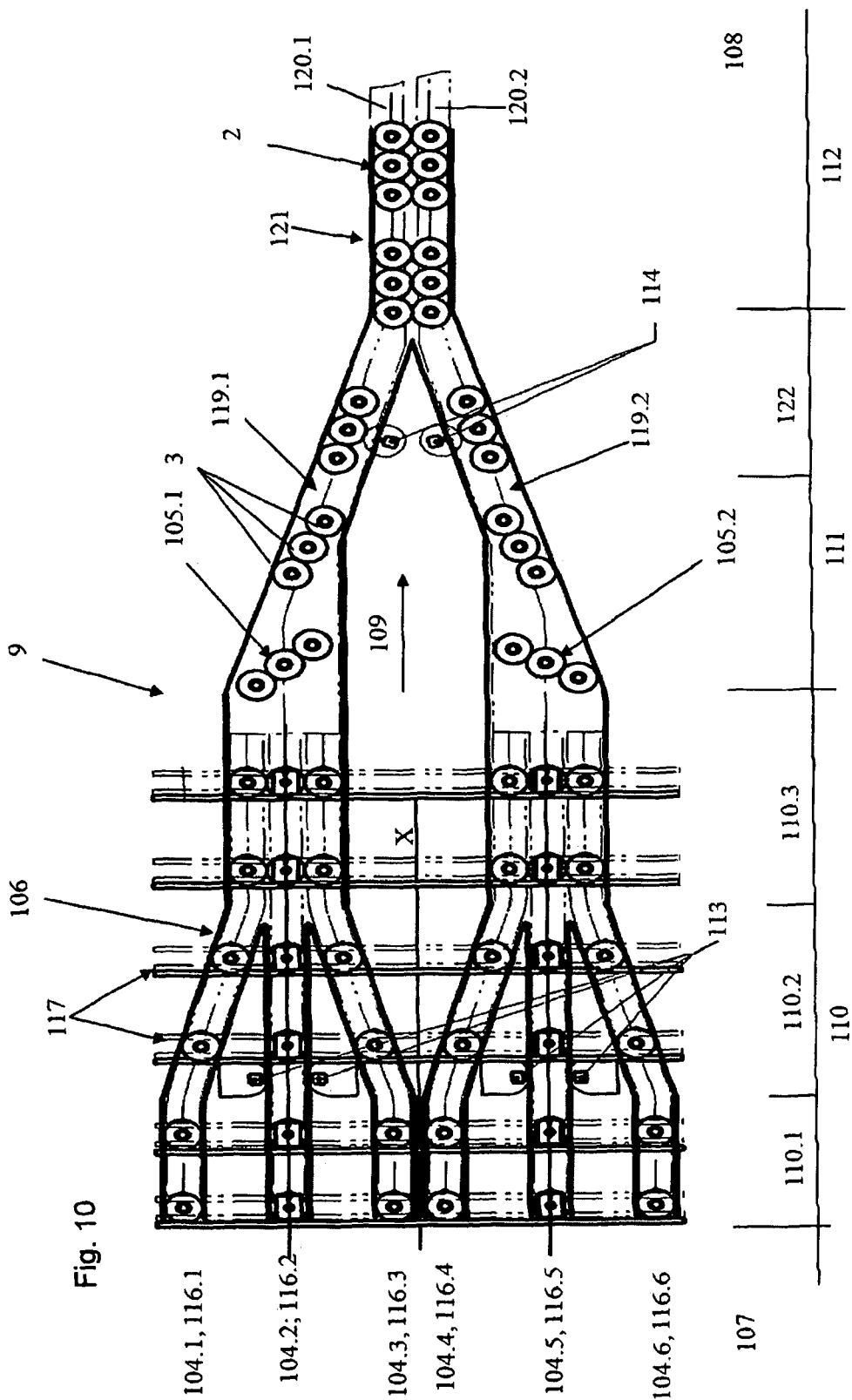
FIG. 10 shows a typical partitioning and compressing unit.

FIG. 10 shows a further partial section of a device 1 for producing bundles 2 from containers 3 that have first been aligned. Unlike FIG. 1 however, six container tracks are provided, which means that two transporters 5 can be provided. By separating and bringing together a predetermined number of containers 3, three containers 3 at a time for example, compressed or formed container groups 105.1, 105.2 or partial bundles 105.1, 105.2 are formed and subsequently each combined to bundle 2, with at least one of containers 3 of bundle 2, preferably each container 3, having an adhesive agent and/or an adhesive agent application on at least one contact surface. The contact surfaces are clearly shown in the figures by the contact of containers 3 against one another but are not provided with a reference number.

FIG. 10 shows a linear transporter 106 that transports containers 3 from an inlet side 107 towards an output end 108. The transport direction from the inlet side 107 to the outlet side 108 is represented by an arrow 109 and corresponds to the previously described transport direction 11. The packaging machine 1 has a center-line X and three sections 110, 111, 112. The first section 110 begins at the inlet side, and merges into the second section 111. The second section 111 adjoins the third section 112.

Application elements 113, 114 are provided in a first section 110 and in a second section 111 of the linear transporter 106 for the application of adhesive agent. Transversely displaceable head guides 115 are provided in the first section 110 of the linear transporter 106. The second section 111 is implemented as a rotation and feed section of partial bundles 105.1, 105.2. In a third section, the partial bundles 105.1, 105.2 are combined to form a complete bundle 2, which is then conveyed towards the outlet side 108.

It is beneficial if the linear transporter 106 has, in its first section, a plurality of transport surfaces 116.1-116.6 that convey containers 3 in corresponding single tracks 104.1-104.6 from the inlet side 107 towards the outlet side 108 and towards the second section 111 of the linear transporter 106. Six transport surfaces 116.1-116.6 are provided for example.

The first section 110 of the linear transporter has three partial regions 110.1-110.3 of which a first partial region 110.1 extends from the inlet side 107 towards the second partial region 110.2, which connects to the third partial region 110.3, which in turn extends to the second section 111 of the linear transporter 106.

In the first partial region 110.1, the exemplary six transport surfaces 116.1-116.6 are parallel with one another, as can also be seen in FIG. 1. In the second partial region 110.2, single-track container streams 104.1-104.6, i.e. transport surfaces 116.1-116.6, are brought together to form respective partial bundles 105.1-105.2.

In the third partial region 110.3, respective partial bundles 105.1-105.2 are transported towards the second section 111.

Two partial bundles 105.1 and 105.2 can, for example, be formed, each having three containers 3. As shown by way of example, the six single-track container streams 104.1-104.6 previously mentioned by way of example are brought together such that, for example, three single-track transport surfaces 116.1-116.3 and 116.4-116.6 each make the partial bundles 105.1-105.2.

In the second partial region 110.2, central transport surfaces 116.2, 116.5 of each of the three transport surfaces 116.1-116.3 and 116.4-116.6 are parallel to one another and to the center-line X of the linear transporter 106. The transport surfaces 116.1, 116.6, 116.3, 116.4 that are on the outside and the inside respectively relative to the central transport surfaces 116.2, 116.5 are respectively guided from the outside towards the center-line X of the linear transporter 106 and from the inside towards the center-line X of the linear transporter 106. The two partial bundles 105.1, 105.2, each having three containers 3, are formed in this way. When seen in plan view, the second partial region 110.2 with its three container tracks 104.1-104.3 and 104.4-104.6 (transport surfaces 116.1-116.3 and 116.4-116.6) which taper from the crossing of the first partial region 110.1 to the third partial region 110.3 can be regarded as conical.

Application elements 113 are arranged in the second partial region 110.2 of the first section 110 of the linear transporter 106. These application elements 113 only provide the containers 3 of the central container track 104.2-104.5 (116.2 and 116.5) with adhesive agent. It is sufficient for the purpose of the invention for just one container 3 of a partial bundle 105.1, 105.2, and preferably a central container 3, to be provided with the adhesive agent on its contact surfaces.

In the third partial region 110.3, the groups of three containers 3 each, which form partial bundles 105.1, 105.2 when seen in plan view, are conveyed towards the second section 111 side-by-side and aligned square to the transport direction 109.

If UV-curing adhesive is applied, a curing station or curing section can be provided in the first section 110, preferably in its third partial region 110.3.

As can be seen from FIG. 10, head guides 115 are disposed on the first section of the linear transporter 106. These head guides 115 can be implemented as packing or centering tulips, similar to those used in labeling machines.

The number of head guides 115 in a transverse row is the same as the number of single-track container streams 104.1-104.6 so that, for example, six head guides 115 can be provided. Head guides 115 are mounted on cross-rails 117, with the corresponding number of head guides 115 being disposed on each cross-rail 117. A plurality of cross-rails 117 are provided. Cross-rails 117 are continuously implemented and attached to a drive element, such as to a chain or belt.

The head guides 115 engage over the container head from above to stabilize their positions during their transport in the transport direction 109. At the inlet side, the head guides 115 lower onto the containers 3 and lift off from the containers at the end of the first section 110.

The head guides 115 can be displaced transversely. This is advisable so that they can in order to be able to continue the positionally stable transporting of the container streams, i.e. outer container streams 104.1, 104.6 and inner container streams 104.3, 104.4, in the second partial region 110.2 when containers 3 are tracked according to the embodiment of the transport path in the second partial region 110.2. In other words, the head guides 115 facilitate the positionally stable bringing together of each of the three container streams 104.1-104.3 and 104.4-104.6 to form partial bundle 105.1, 105.2 even along transport surfaces 116.1, 116.3 116.4, 116.6, which run at an angle towards their respective central transport surfaces 116.2, 116.5.

Head guides 115 however also have the function of exerting sufficient force on bundled containers 3, which is very conducive to an adhesive bond. As shown in FIG. 10, head guides 115 can be displaced relative to the cross-rails 117, with the head guides 115 usefully having an appropriate drive. Outer and inner head guides 115 with containers 3 guided thereon are guided towards one another, with partial bundles 105.1 and 105.2 or their containers 3 being pressed against one another under the application of force along their transport path. The drive of head guides 115 can be implemented as a sliding block guide with the head guide 115 engaging in the corresponding guide by a control element. A further possibility is a motorized drive, preferably driven by an electric motor.

In the second section 111, which follows on from the first section 110 of linear transporter 106, partial bundles 105.1, 105.2 are preferably rotated by 90° out of their alignment square to the transport direction 109 so that the partial bundles 105.1 and 105.2 are aligned parallel with the transport direction 109. This aligning effect can be assisted if the second section 111 is continuously tapered in its transport width of the two lanes of partial bundles 105.1, 105.2 such that in an end region 122 of the second section 111, the transport width is slightly greater than the diameter of container 3, with only one transport path 119 being provided in the end region 118 for respective partial bundle 105.1, 105.2.

In its end region 118 therefore, the second section 111 is configured with only one transport path 119.1, 119.2 per partial bundle 105.1, 105.2, which in the preferred embodiment guides the two partial bundles 105.1 and 105.2 towards one another at an angle to the transport direction.

Further application elements 114 are provided in the end region 118. These further application elements 114 apply adhesive to the contact surfaces of containers 3 arranged in respective partial bundles 105.1, 105.2. A further beneficial measure is for the transport width of respective transport paths 119 to be slightly greater than the diameter of containers 3 to avoid having the sticky side, which carries the adhesive, rub along containing walls and impair the adhesive application.

The two partial bundles 105.1 and 105.2 are brought together at the exit of the second section 111 and the entry of the third section 112 to form a complete bundle 2, with the contact surfaces provided with adhesive lying against one another. The third section 112 has two transport surfaces 120.1, 120.2, one for each original partial bundle 105.1, 105.2.

Lateral guide elements 121 are disposed on the transport surfaces 120.1, 120.2. These guide elements 121 are parallel to the transport direction 109 and at a distance from the center-line X such that complete bundle 2 or containers 3 contained therein are pressed against one another to promote production of the adhesive bond.

Guide elements 121 may also be referred to as guide rails that guide or support bundles 2 or containers 3 of a bundle 2 between them. It is conceivable for guide elements 121 to be rigidly implemented. It is however also possible for guide elements 121 to be configured as travelling elements such that containers 3 or bundles 2 do not have a speed relative to the laterally disposed guide elements 121. A lateral pressure to promote an adhesive bonding of containers 3 of bundle 2 can be generated with the laterally disposed guide elements 121. The guide elements 121 therefore not only have the function of guiding and supporting but also the function of generating a pressure acting on containers 3, which when looked at square to the transport direction 9 compresses containers 3 of bundle 2 and draws them nearer to one another, pressing them against one another so as to promote an adequate adhesive bond.

As can be seen in FIG. 10, that guide elements 121, which have at times been referred to as a wall, are also provided in first sections 110, 111. The guide elements 121 can basically be adjustable to allow containers 3 of different diameters to be combined with the device to form a bundle 2. Some embodiments features a continuous adaptation for adjusting the clear width between laterally arranged guide elements 121.

If UV-curing adhesive is applied, a curing station or curing section can be arranged in the third section 112. Entraining elements, such as in the first section 110 could be provided at the third section 112 to assist in transporting complete bundles 2 towards the outlet side 108.

The bundle, i.e. the complete bundle, which is made up of the partial bundles, can be implemented in a plurality of rows when seen in the transport direction, i.e. as depicted, for example, in two or three rows.

It is possible also to provide a bundle 2, i.e. a complete bundle 2, with a carrying element, for example a handle. Suitable devices may be provided downstream of the outlet side 108 or at a suitable position on the linear transporter 106. The carrying element can be attached to bundle 2 with the afore-mentioned adhesive agent.

Application elements 113 and 114 are provided for applying the adhesive agent, preferably the liquid i.e. low-viscosity adhesive agent, with the especially preferred property of a UV-curing adhesive. These application elements 113 and 114 can be implemented as an applicator head or spray head. As can be seen in FIG. 10, only a middle container 3 of a subsequent partial bundle 105.1, 105.2 is provided with adhesive agent by the application elements 113, The application elements 113 are each is posed on both sides of a middle container 3. The application elements 114 in the second section 111 are arranged near the junction at an end triangle defined by the transport paths 119.1, 119.2.

In the depicted embodiment, application elements 113, 114 are arranged rigidly, i.e. immovably, on device 100. In a further embodiment it is conceivable for application elements 113 and 114 to travel with a bundle 2 in common or singly at least along a partial section so that they can then be returned to the initial position to provide a new bundle 2 or its containers 3 with adhesive at the contact surfaces.

In a preferred embodiment an entraining element can be configured as a bar, preferably as a round bar. The entraining elements may also be themselves driven and/or be in connection with guide elements 121. If the entraining elements are driven, they may glide or roll along on guide elements 121 with gliding or rolling means. The entraining elements may be interconnected by way of pulling means, such as a rope, a chain, a toothed belt or a similar structure so as to form continuous entraining elements. This also applies to the entrainers in first section 110.

The embodiment according to FIG. 10 is intended by way of example only. Other embodiments with a linear transporter and/or with a star-wheel transporter are submitted by the applicant on the same application date and become fully part of this invention.

Having described the invention, and a preferred embodiment thereof, what is claimed as new and secured by letters patent is:

LIST OF REFERENCE CHARACTERS

Device for producing bundles/packing machine
Bundle
Container
Container track
Transporter
First section
Alignment section
Third section
Partitioning and/or compressing unit or section
Single-station conveyor element
Transport direction
Inlet side
Outlet side
Cross-rail
Driving means
Crossing
Deflector element
Tip
Base
Carrier body
Controllable rotation element/rotatable support surface
Shaft
Gearwheel/pulley
Adjustment element
25 Driven wheel
26 Guide element
Chain/belt
Rack
Longitudinal spar
Fixing element
Transverse bar
Guide rail
Transport paths/container tracks
Container track (104.1 to 104.6)
Partial bundle (5.1 and 5.2)
Linear transporter
Inlet side
Outlet side
Transport direction
First section of 6 110.1 to 110.3 Partial regions of 110
Second section of 6
Third section of 6
Application element
Application element
Head guides
Transport surfaces (116.1 to 116.6)

Cross-rail
Drive element for 117
Transport path in 11 (19.1 and 19.2)
Transport path in 12 (20.1 and 20.2)
Guide elements on 112
End region of 11

The invention claimed is:

1. An apparatus for producing bundles of containers from containers that are provided by a container input, wherein the container input that provides said containers to be bundled comprises a structure selected from the group consisting of a single track container feed, a multiple track container feed, a single track container stream, and a multiple track container stream, wherein containers that arrive on said container input have an arbitrary orientation with respect to a container structure, wherein said container structure is selected from the group consisting of a container feature and a configuration feature of said container, wherein a grouping structure partitions and compresses a predetermined number of containers, wherein said grouping structure is selected from the group consisting of a partitioning unit, a compressing unit, a partitioning section, and a compressing section, wherein said predetermined number of containers are at least one of compressed and formed into at least one of container groups and partial bundles that are formed and subsequently combined into a subsequent bundle, wherein application elements are provided by way of which a substance can be applied on at least one contact surface of at least one of said containers of said subsequent bundle of containers, wherein said substance is selected from the group consisting of an adhesive agent and an adhesive agent application, wherein said apparatus comprises a plurality of infinitely revolving single-station conveyor elements, an adjustment element, a transporter for transporting in a transport direction, an alignment section, and a controllable rotation element, wherein said alignment section is a constituent of said transporter, wherein said controllable rotation element is a constituent of said transporter, wherein said infinitely revolving single-station conveyor elements are constituents of said alignment section, wherein said infinitely revolving single-station conveyor elements are drivable in said transport direction, and wherein said adjustment element is arranged in said alignment section, wherein said adjustment element is capable of being actuated, wherein said controllable rotation element interacts with said adjustment element, and wherein said grouping structure is downstream of said alignment section.

2. The apparatus of claim 1, further comprising cross-rails, wherein said single-station conveyor elements are arranged side-by-side on said cross-rails in said transport direction at right angles to said transport direction.

3. The apparatus of claim 1, further comprising deflector elements, wherein said deflector elements are arranged at a crossing between a first section of said transporter and said alignment section.

4. The apparatus of claim 3 wherein each deflector element comprises a wedge having a tip and a base.

5. The apparatus of claim 1, wherein said rotation element comprises a rotatable support surface, and a shaft disposed on said surface, said shaft comprising a structure selected from the group consisting of a gearwheel, a pulley, and a geared section.

6. The apparatus of claim 1, further comprising a support surface of a single-station conveyor element, wherein said adjustment element is arranged opposite said support surface on an underside of said alignment section.

7. The apparatus of claim 1, wherein said adjustment element comprises a first structure and a second structure, wherein said first structure is selected from the group consisting of a chain and a belt drive, a driven wheel, and an idling wheel about which a second structure is guided, wherein said second structure is selected from the group consisting of an endless chain and an endless belt.

8. The apparatus claim 1, said apparatus further comprising cross-rails and longitudinal spars, wherein said rotation element comprises a shaft, wherein said shaft comprises a gearwheel, wherein said adjustment element comprises a rack-and-pinion drive, wherein said rack-and-pinion drive comprises a rack that engages said gearwheel of said shaft of said rotation element, wherein said rack is arranged parallel to cross-rails on said longitudinal spars, wherein said longitudinal spars are mounted on said cross-rails, and wherein at least in part as a result of being mounted on said cross-rails, said longitudinal spars are capable of transverse displacement.

9. The apparatus of claim 1, further comprising a detection system, wherein said detection system compares an actual position of said containers with a desired position of said containers, wherein said detection system generates a control signal for causing operation of said adjustment elements, wherein causing operation comprises at least one of causing actuation of an adjustment element and causing adjustment of an adjustment element, wherein operation of said adjustment element results causes said rotation element to operate in a manner that permits at least one of movement and rotation of a container into a desired position thereof.

10. The apparatus of claim 1, wherein said transporter further comprises fixing elements, and wherein said fixing elements are arranged in a third section that is downstream from said alignment section.

11. The apparatus of claim 1, wherein said container input is a multiple-track container input.

12. The apparatus of claim 1, wherein said container input is a single-track container input.

13. The apparatus of claim 3, wherein each of said deflector elements defines a right triangle.

14. The apparatus of claim 13, wherein each of said right triangles has a hypotenuse, and wherein hypotenuses of all of said right triangles extend along parallel lines.

15. The apparatus of claim 4, wherein said tip is upstream from said base.

16. The apparatus of claim 3, wherein said deflector elements are configured to homogenize deflections of containers traversing said crossing.

17. The apparatus of claim 3, wherein each of said deflector elements comprises a pointed cone.

18. The apparatus of claim 3, wherein each of said deflector elements comprises a first end and a second end, wherein said second end is narrower than said first end.

19. The apparatus of claim 18, wherein said first end is downstream of said second end.

20. The apparatus of claim 1, wherein said containers in said predetermined number of containers are formed into partial bundles that are subsequently combined into a subsequent bundle.

\* \* \* \* \*